United States Patent [19]

MacLaughlin et al.

[11] Patent Number: 4,468,265

[45] Date of Patent: Aug. 28, 1984

[54] LIVE TOOL INSPECTION SYSTEM FOR SPINWELDING MACHINERY

[75] Inventors: Donald MacLaughlin, Midland, Mich.; Vincent E. Fortuna, Huntington Beach, Calif.

[73] Assignee: Cosden Technology, Inc., Big Spring, Tex.

[21] Appl. No.: 337,449

[22] Filed: Jan. 6, 1982

[51] Int. Cl.³ .............................................. B32B 31/22
[52] U.S. Cl. ..................................... 156/64; 156/73.5; 156/366; 156/378; 228/2; 250/338; 250/341; 324/175
[58] Field of Search .................... 73/488; 156/64, 73.5, 156/366, 378, 379; 226/45; 228/2; 250/302, 338, 341, 342; 324/175

[56] References Cited

U.S. PATENT DOCUMENTS

| | | | |
|---|---|---|---|
| 3,708,376 | 1/1973 | Mistarz et al. | 156/73.5 X |
| 3,753,820 | 8/1973 | Ishikawa et al. | 156/73.5 |
| 3,949,856 | 4/1976 | Ulber et al. | 226/45 X |
| 4,168,430 | 9/1979 | Denis et al. | 250/342 X |
| 4,195,291 | 3/1980 | Burks | 324/175 X |

Primary Examiner—Robert A. Dawson
Attorney, Agent, or Firm—Paul Devinsky; M. Norwood Cheairs

[57] ABSTRACT

Disclosed is a method and apparatus for determining the quality of a spinweld bond produced on a single or multiple spindle production spinwelder and to a method and apparatus for alarming and/or ejecting products containing defective welds.

The method and apparatus of the present invention utilizes a detector means to determine the condition of a tool or spindle (i.e., if it is still "live" rotating at a point when it should be at rest) and a timing means to actuate an indicator when a live tool is detected. The present invention also involves a means to detect a spinwelder with an actuated indicator and to eject the product thereon. The present invention also relates to a method and apparatus for automatically shutting down a spinwelder producing an excess of defective products.

38 Claims, 8 Drawing Figures

LIVE TOOL INSPECTION SYSTEM FOR SPINWELDING MACHINERY

BACKGROUND OF THE INVENTION

1. Field of the Invention

This present invention relates to a method and apparatus for controlling thermoplastic friction welding machines. More particularly, the present invention relates to an electromechanical method and apparatus for determining the quality of a spinwelded bond produced by a single or multiple spindle production spinwelder and further to a method and apparatus for alarming and/or ejecting products containing defective welds.

2. Background of the Invention

In the art of joining thermoplastic articles by friction welding, a device may be used which spinwelds thermoplastic axially mating sections. The sections are driven in rotation relative to each other and then axially abutted in mating relationship. In a device, such as that disclosed in U.S. Pat. No. Re 29,448, one of the two mating sections is chucked to an initial member which is brought up to speed by a rotary drive. The rotary drive is uncoupled as the sections are moved into axial abutment and the breaking of the inertia member by the axial abutment of the sections is transformed into frictional heat which welds the thermoplastic seams to each other.

The apparatus described above may typically be a part of a larger apparatus such as that disclosed in U.S. Pat. No. 3,800,376 for performing a plurality of successive operations with individual container sections.

The processing operations may typically include the dispensing of container sections and the assembly, filling and sealing of the containers. On a single platform, a plurality of spaced processing units may be rotatably mounted. Each unit will typically include a plurality of circumferentially spaced carrier stations for moving container sections or containers about the unit axis of rotation. A plurality of spaced star wheel transfer units may then be disposed intermediate and adjacent to the processing units. The star wheels receive container sections or containers from and deliver them to the processing units at transfer zones defined generally tangentially of each of the processing units and an adjacently disposed star wheel unit. A transfer unit may be rotatably mounted on the platform and may include a plurality of circumferentially spaced carrier stations for moving the container sections or containers about the axis of rotation. The circumferential spacing of the carrier station on the transfer and processing units will typically be substantially the same throughout; and the transfer and processing units are geared together for simultaneous rotation, with the carrier stations of each of the processing units and an adjacently disposed transfer unit rotating in opposite angular directions. The initial processing units will typically have dispensers for supplying individual container sections to an adjacent transfer unit.

In addition, the invention may be useful with a friction welding machine for joining thermoplastic container top and bottom parts which are moved continuously along a production line as disclosed in U.S. Pat. No. 3,759,770. Star wheel loading and unloading members incorporating suction pads for gripping the parts as they move to the holders where flutes, in at least some of the holders, communicate the suction chambers in the holders with a vacuum source, and also hold the parts during the friction welding operation may be used.

Alternatively, the invention may be useful in connection with a device such as that disclosed in U.S. Pat. No. 3,708,376 wherein a pedestal assembly for accurately receiving and positively capturing a lower thermoplastic container half when it is being transferred in to and rotated by a spin welding apparatus is disclosed. The spin welding apparatus frictionally joins the lower container half to an upper container half to form a unitary container. The lower container half is received by the pedestal assembly from a rotating star wheel transfer device which slides the lower container half onto a stage portion of the assembly. The pedestal assembly having the container half thereon is then rotated in an opposite direction from that of the star wheel transfer device. The pedestal assembly including the stage portion has a dome-shaped upper surface which cooperates with a complementary recessed bottom of the lower container half. Vacuum means are applied through a central opening in the pedestal assembly for aiding in the positive capture of the lower container half.

Other devices where the present invention may find applicability are disclosed in U.S. Pat. No. 3,216,874 to G. W. Brown; U.S. Pat. No. 3,220,908 to G. W. Brown et al; U.S. Pat. No. 3,316,135 to G. W. Brown et al; U.S. Pat. No. 3,499,068 to G. W. Brown; U.S. Pat. No. 3,607,581 to G. A. Adams; U.S. Pat. No. 3,669,809 to G. W. Brown; U.S. Pat. No. 3,701,708 to G. W. Brown et al; U.S. Pat. No. 3,708,376 to R. J. Mistarz et al; U.S. Pat. No. 3,726,748 to R. J. Mistarz et al; U.S. Pat. No. 3,726,749 to R. J. Mistarz et al; U.S. Pat. No. 3,744,212 to R. J. Mistarz et al and U.S. Pat. No. 3,847,014 to R. J. Mistarz. It will be appreciated by the artisan that the control system of the present invention and the method by which it operates can be adapted to other devices as well.

In general, during the spinwelding process, welds are produced by the stowage of kinetic energy in the driving tool. When the two functional surfaces to be welded are brought into intimate contact, the kinetic energy is dissipated in the form of heat, thus resulting in fusion or welding of the surfaces brought together.

For purposes of the description which follows, a defective weld is defined as a failure to create a bond of adequate strength, usually due to a failure of either a loss of one of the surfaces to be welded through, for instance, a missing component or an improper fit; or a mechanical failure of a driving tool or the driven position of one of the components to be welded.

The method and apparatus of the present invention is designed to detect excess rotation of a driving tool at a point in the spinweld process where the tool should be at rest.

In connection with known spinwelding devices, a need exists for accurately and instantly determining when a container weld is defective or when an accomplished container weld has fractured. In addition, there is a need to identify and remove any defective product such as a container so that it will not be utilized and its intended contents wasted. It is desirable to perform this operation accurately and automatically to maximize the production output of the overall system. In addition, it is both necessary and desirable to identify any particular piece of equipment wherein a large amount of defective containers are being produced to allow for remedial or protective action.

In addition, it is necessary to design a control system for an apparatus as noted above that can be retrofitted into existing equipment or incorporated in new units and which therefore uses a low voltage power source.

OBJECTS AND SUMMARY OF THE INVENTION

Accordingly, it is an object of the present invention to provide a method and apparatus for controlling friction welding machines.

It is a further object of the present invention to provide a method and apparatus for determining when a thermoplastic weld is defective.

It is a further object of the invention to provide a method and apparatus for removing or ejecting products with defective welds.

It is still a further object of the present invention to provide a method and apparatus for determining when a particular unit is producing an excessive number of defective products and then identifying the equipment problem or automatically shutting the unit off.

In addition, it is still a further object of the present invention to provide a control device which may be retrofitted onto existing equipment.

To achieve the foregoing and other objects and in accordance with the present invention, as embodied and broadly described herein, the method and apparatus of this invention may comprise either a single spindle system in which the invention would preferably operate on a time basis following weld initiation, or a multiple spindle application wherein the system would preferably scan the product at a fixed point in the machine's rotation position and then alarm and/or reject any defective product.

The more complex multiple spindle embodiment would, in accordance with the present invention, comprise a means for detecting if a tool or spindle is live, i.e. turning at a position after a weld should have been accomplished and the spindle be at rest, thus indicating a defective weld has occurred. When a live spindle is detected, a mechanical "flag", a light or an alarm may be used to identify the station having the defective product.

Preferably, a mechanical flag is used which can also preferably be used to actuate the defective product eject mechanism which senses the presence of the flag and energizes an eject mechanism.

Preferably, the mechanical flag may be a metal member which is raised by a solonoid type device such as an air cylinder. The raised flag will be sensed by a proximity detector, preferably a Hall type sensor which will then, in a multiple spindle arrangement, preferably actuate a timing circuit which will time the point at which the defective product passes an ejection station which will remove the defective product from the production system.

Preferably the system will also include a means for determining the number of defective products attributable to each piece of equipment and if the number of defective welds becomes excessive, an automatic maintenance notice and/or system shutdown is effected.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE PREFERRED EMBODIMENTS

Figure 1:
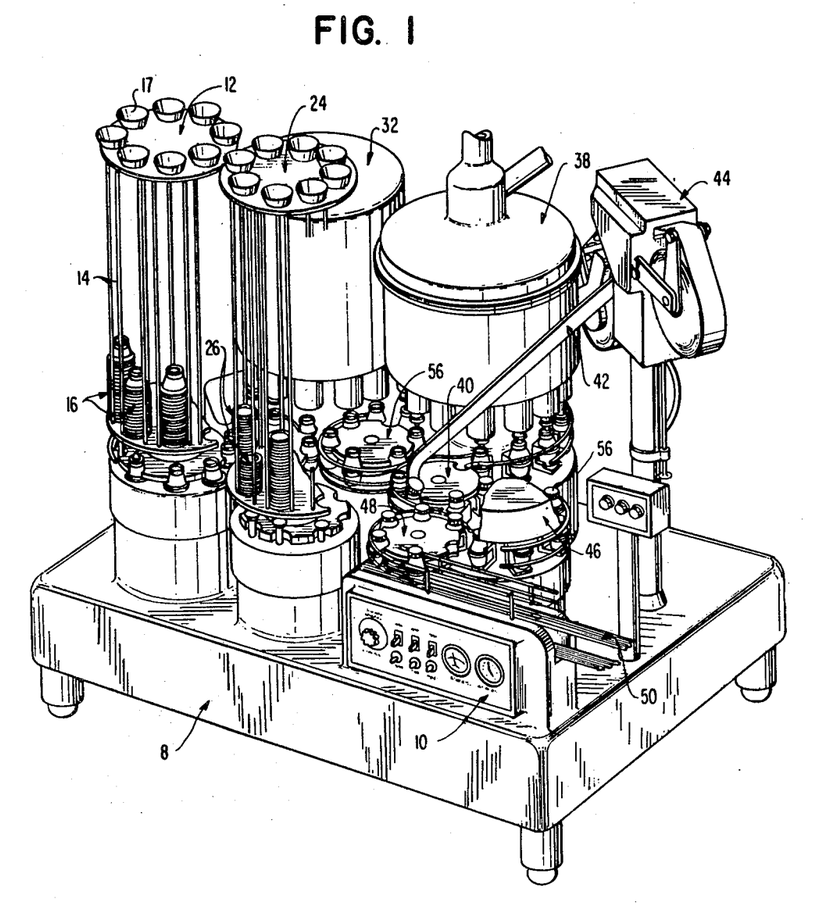
FIG. 1 is a perspective view of a machine for dispensing upper and lower plastic container halves from nested stacks thereof which may be used with the sytem of the invention, joining these container halves together to make containers, filling the containers, and affixing caps onto the tops of the containers.
Figure 2:
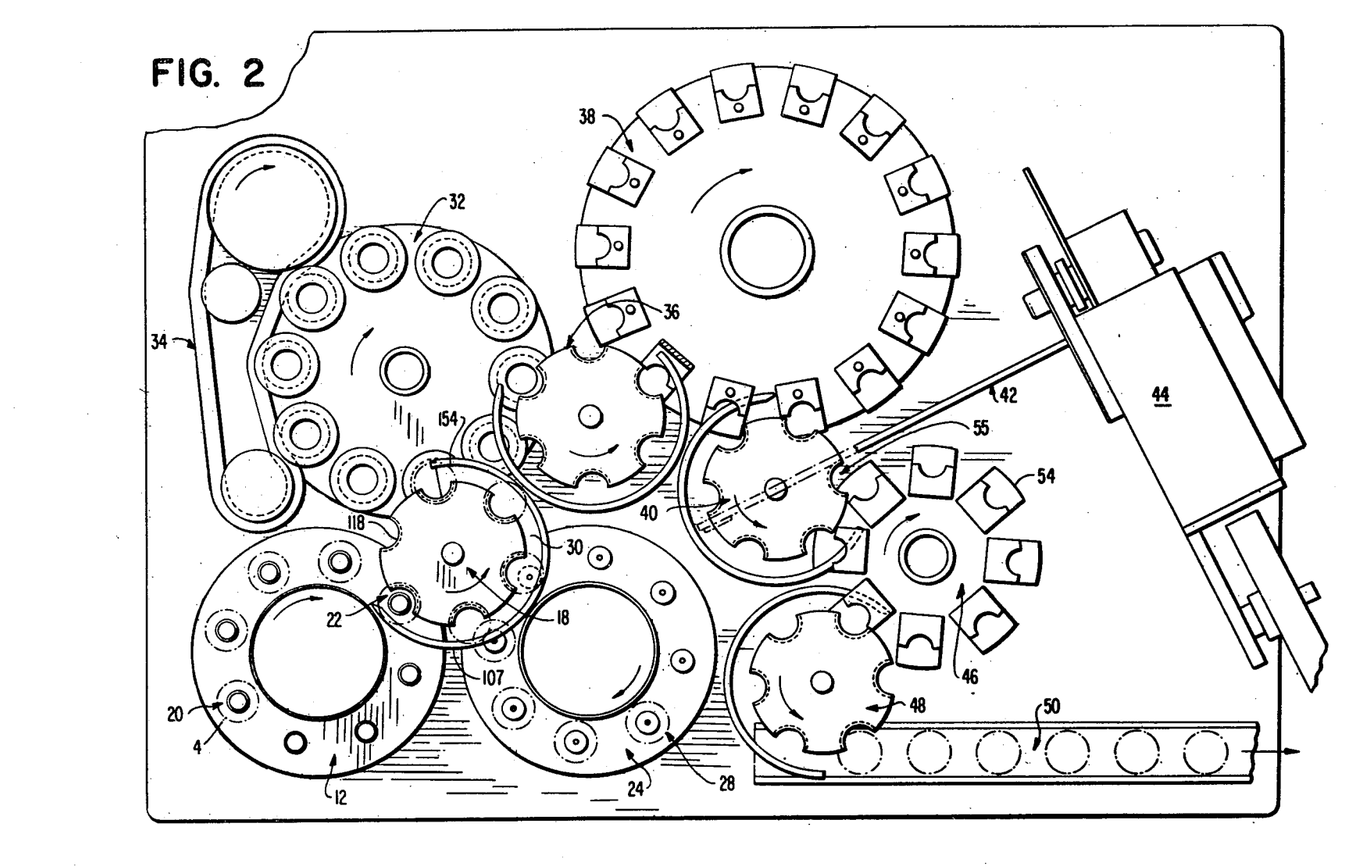
FIG. 2 is a somewhat diagrammatic plan view of the machine of FIG. 1.
Figure 3:
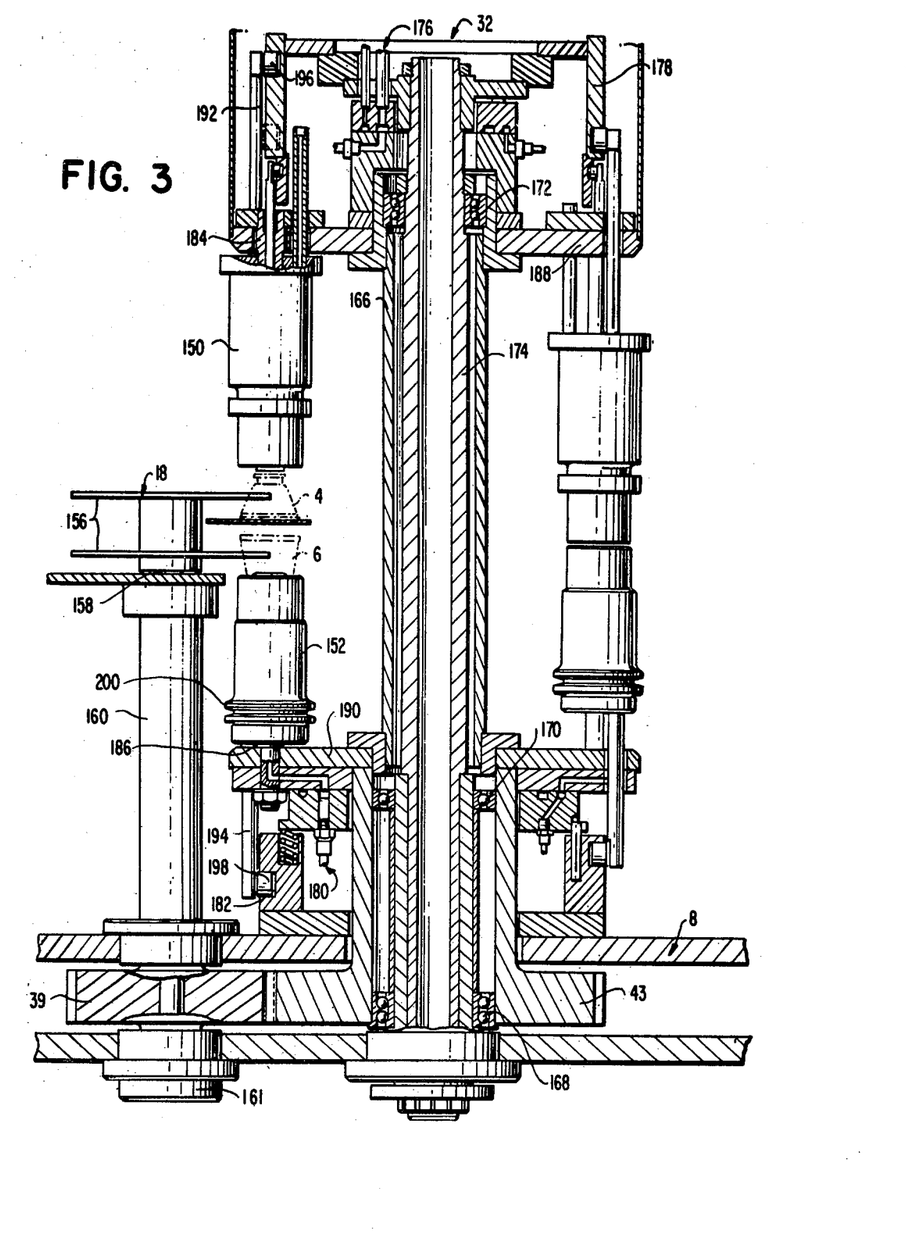
FIG. 3 is a vertical cross-sectional view through the spinwelding unit of the machine of FIGS. 1 and 2.

It will be helpful at the outset to describe generally the overall construction and operation of a spinwelding machine with which the present invention may be used. It should be understood that the details of the spinwelding machine described below are exemplary only and the detection/ejection system of the present invention may be used with other machines as well. One such machine is illustrated in FIGS. 1, 2, and 3. This machine assembles plastic containers with bulk supplies of nested container halves, fills the containers, and caps and seals the open tops of the filled containers.

The containers are assembled from separately fabricated container top halves 4 and container bottom halves 6, with the two halves of each container being frictionally welded together at the middle of the container.

The machine is in the form of a base or table structure 8 carrying hereon a control panel 10, a series of processing units and means for transferring the container portions to and from the various processing units. The processing units and the transfer means are driven by intermeshing gears corresponding in location to the configuration shown in FIG. 2. Preferably, a single drive unit may be employed to impart rotational movement to each drive gear and to each corresponding processing unit and transfer means. Also, the pitch line circles of the intermeshing gear drives preferably are in alignment with the circles formed by joining the centerlines of the container halves and the containers as they travel throughout the system. The processing units are all rotatable units, and transfers between units are accomplished through rotating star wheels, permitting the compact and efficient arrangement indicated in FIG. 1 of the drawings.

The upper and lower container halves 4 and 6, respectively, are delivered from the star wheel device 18 into alignment with the center lines of an upper cylindrical mandrel 150 and a lower cylindrical mandrel 152. The mandrels are mounted for movement in a circular path about the central axis of the spin welder 32 (FIG. 3). The transfer takes place at an angular zone where the star wheel periphery moves into a position of tangency to the path followed by the several upper and lower mandrels. This transfer is assisted by conventional stationary guide rails 154 as illustrated in FIG. 2. The end portions of the guide rails 154 intersect the path of the container halves on the star wheel 18 and cause the container halves to move onto the mandrels rather than permitting them to continue to move about the axis of the star wheel.

The star wheel device 18 includes upper and lower generally circular plates 156 having general semicircular, even circumferentially spaced cutouts 118 at their peripheries for engaging the outer peripheries of the container halves 4 and 6. The cutout portions of the upper and lower plates are superposed and the pairs of superposed cutout zones comprise carrier stations of the star wheel device 18. The plates 156 are carried by a shaft 158 extending through a stationary cylindrical member 160 and being connected at its lower end portion to a drive gear 39. This shaft 158 is journalled within bearing means carried by the frame or table 8 and indicated generally at 161 in FIG. 3.

The spin welder drive gear 43 is attached to a hollow drive shaft 166 extending upwardly about the center of the spin welder unit 32. This hollow shaft is rotatable about bearing means 168, 170, and 172 which are located between a stationary vertical shaft 174 and the hollow drive shaft 166.

At its upper end the center stationary shaft 174 supports a stationary vacuum supply means generally indicated at 176 and an annular cam track 178. The platform 8 also has a part thereof a vacuum supply shown generaly at 180 and an annular cam track 182. The detailed operation wherein the cam tracks 178 and 182 are used will be subsequently described.

It would be helpful at this point to describe generally the spin welding operation to form a basis for the detailed description which follows. The container halves, once aligned with the center lines of the upper and lower spindles or mandrels 150 and 152, are surrounded by the spindles for subsequent spinning. The spindles rotate about the central axis of the spin welder 32 and also move vertically toward each other when surrounding the container halves. The lower spindle 152 which surround the bottom half additionally rotates about its own axis during the spinning operation. Once the container halves are frictionally welded, the spindles are caused to separate and free the surrounded joined container.

Each of the spindles is moved vertically on a shaft which is stationary with respect to its own axis but which revolves about the central axis of the spin welder unit 32. The shafts for the upper mandrels 150 are designated 184 and the shafts for the lower spindles 152 are designated 186. Each upper spindle shaft 184 extends downwardly from a support member 188, and each lower spindle shaft 186 extends upwardly from a support member 190. These support members 188 and 190 are carried by main rotating shaft 166 at the center of the spin welder, so that the spindle shafts 184 and 186 revolve about the central axis of the spin welder 32. The rotational movement of the shafts 184 and 186 about the spin welder central axis causes the spindles 150 and 152 to rotate therewith.

Vertical movements of the spindles with respect to their shafts 184 and 186 are achieved by means of connecting rods 192 and 194 operatively connected to the spindles 150 and 152, respectively. These connecting rods have cam followers cooperating with the previously mentioned stationary cam tracks to vertically position the upper and lower spindles as they rotate about the central axis of the spin welder 32. The upper connecting rod 192 has cam follower 196 thereon for traveling within the stationary upper cam track 178. The lower connecting rod 194 also has a cam follower 198 associated therewith for movement within the lower cam track 182.

Each lower spindle 152 is additionally capable of spinning about the axis of its shaft 186 when a pulley area 200 thereof is brought into contact with the spin welder driving belt 34 (FIG. 2) during a predetermined number of degrees of the rotation of the mandrel about the central axis of the spin welder 32. For this purpose, bearing means (not shown) are interposed between each spindle 152 and its shaft 186.

The upper vacuum supply indicated generally at 176 is suitably connected to a vacuum port which feeds to the periphery of a central opening (not shown) within the upper mandrel. The shape of this opening conforms generally to the shape of the upper container half 4. The vacuum is applied about the outer periphery of the container half 4 when it is being surrounded by the upper spindle 150.

Figure 4:
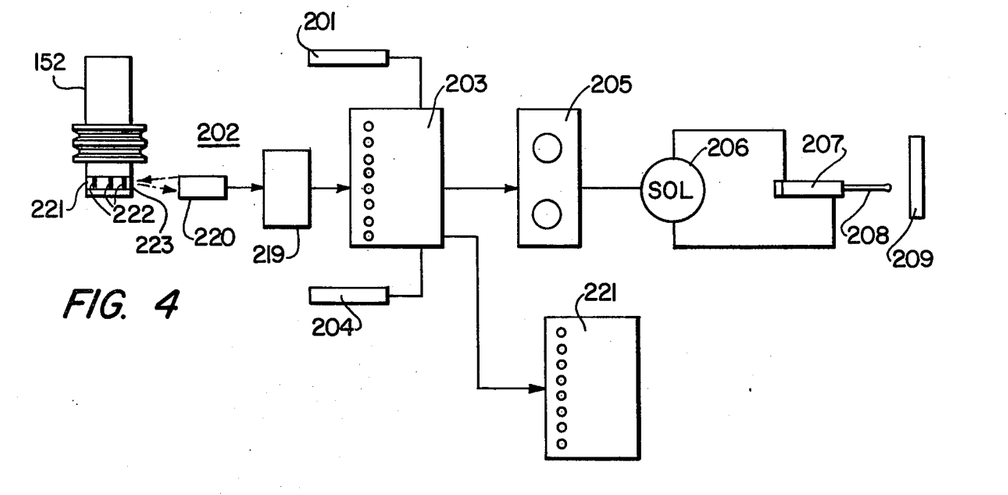
FIG. 4 is a block diagram of the live spindle inspection system in accordance with the present invention.

Turning now to FIG. 4, there is depicted a block diagram of the live tool inspection system of the present invention. Each driving spindle, for instance 152 in FIG. 3, is equipped with an optical scan bar 221 positioned around its circumference. This scan bar consists of a series of reflective (222) and non-reflective (223) bars or surfaces that produce a series of reflective impulses when the spindle or mandrel 152 is rotated. In addition, a proximity probe 201, such as that available from Peico Electric Eye, Model No. RLS, is used to sense the proximity of a timing marker on a multiple spindle machine. The probe may be a Hall effect type device and will emit a single pulse of for instance 5-10 ms duration each time the shaft 166 (FIG. 3) rotates; see FIG. 8, time chart A. The probe 201 functions as a logic probe to turn on the system in sequence with the arrival of the first container at the scan point. Thus, previous empty tools or spindles are ignored. Once probe 201 turns the system on, the reflective electric eye 202 scans each passing tool to determine if it is rotating. An excess of rotation, determined as described herein below, causes electric eye 202 to emit an output pulse for each reflective bar 222 that rotates past its field of view.

An electric eye 202, such as that available from Peico Electric Eye, Model PDR may be used for this purpose. The emitter/detector system will preferably consist of a frequency modulated infrared emitter/detector system (219, 220) to prevent cross talk with other electric eyes in the system. In any event, the emitter/detector system must have a very fast response time.

Figures 7, 8:
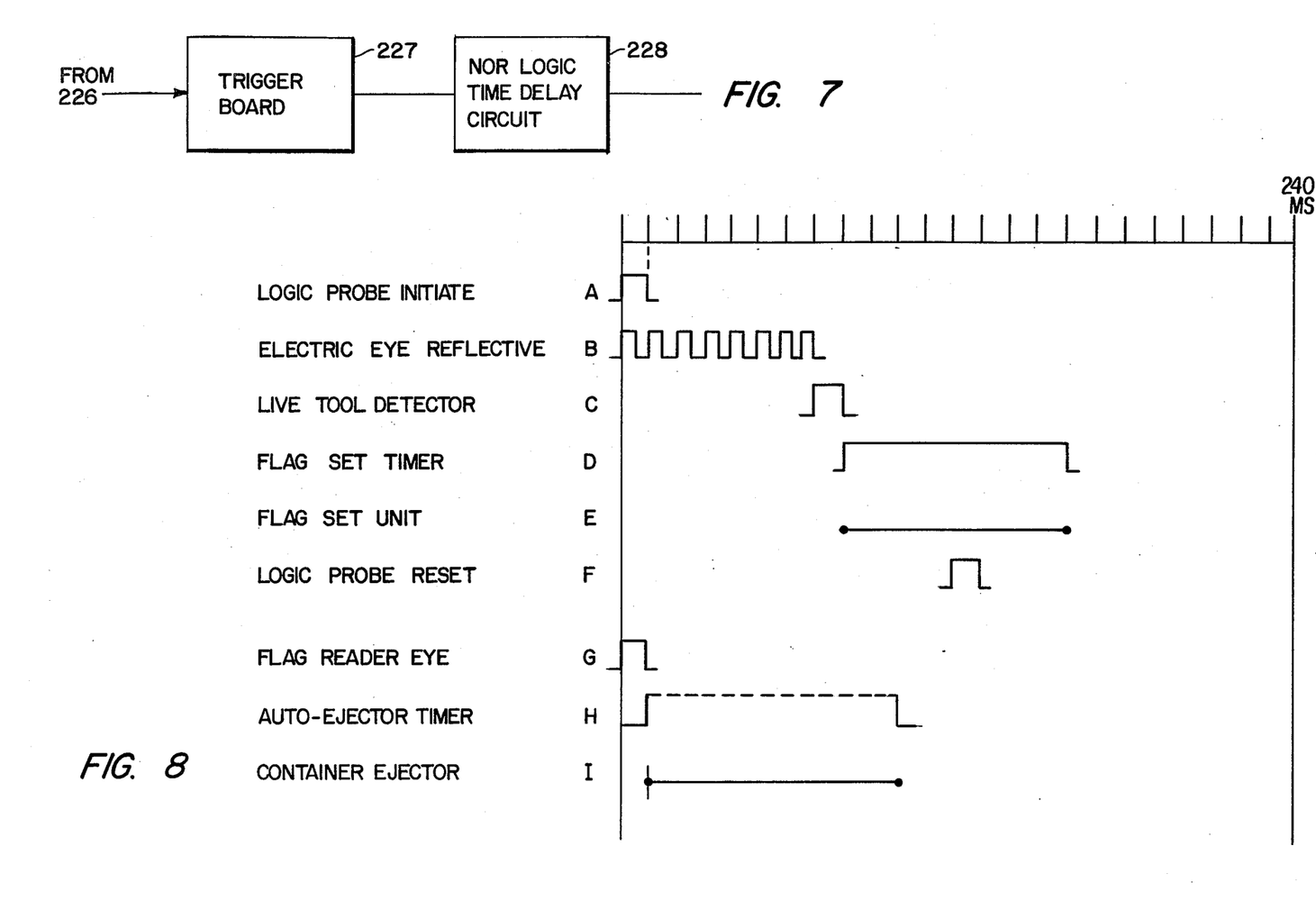
FIG. 7 is a block diagram of the flag set timer of FIG. 4.
FIG. 8 is a timing chart of the system of FIGS. 4 and 5.

A live spindle detector, 203 receives the pulses from the electric eye 202, shown in FIG. 8, time chart B, and compares the total number of pulses received with a preset digital register. If the number of pulses received is below a preset register set point, no output is generated by detector 203. If the number of pulses exceeds a predetermined set point, the detector 203 will emit a single pulse of relatively short duration, for example on the order of 10 ms; see FIG. 8, time chart C.

Figure 6:
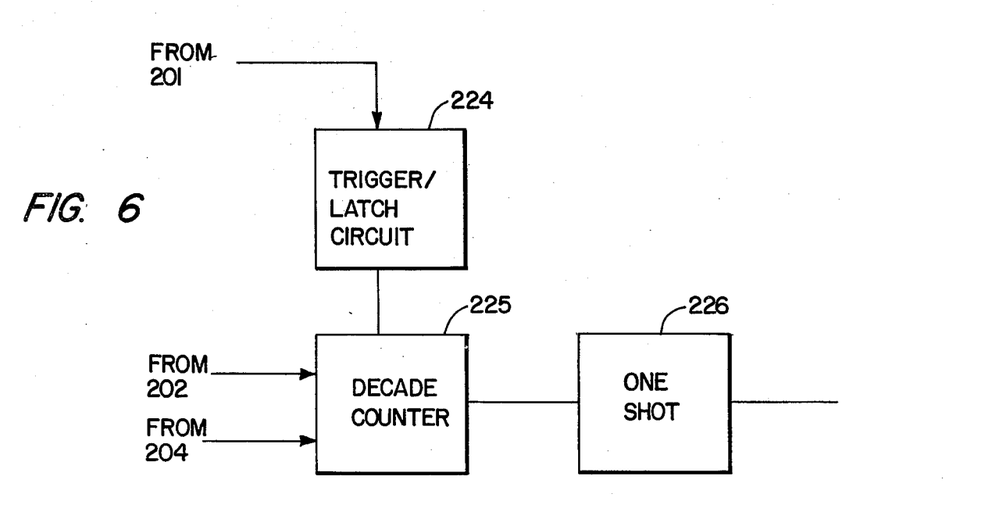
FIG. 6 is a block diagram of the live spindle detection of FIG. 4.

For the detector 203, a detector such as that available from Vercon, Inc., Model No. DK-128, may be used. As best seen in FIG. 6, the detector may preferably comprise of a trigger latch circuit 224, a decade counter 225 and a one shot 226. The trigger latch circuit 224 functions in a manner similar to an SCR. Upon receipt of the initial trigger signal from probe 201, the trigger/latch circuit 224 will energize the control system (which is powered from a 12 v DC bus) and also automatically clear the decade counter 225 so that it starts each spindle rotation count at zero.

With regard to the decade counter 225, it is programmed so that if its pulse count from electric eye 202 exceeds a predetermined level, for instance on the order of approximately six, it will generate an output. The reason a threshold level is used before an output will be generated is to provide for the typical situation of a spindle or tool going past the field of view of the electric eye 220 wherein typically, several reflective surfaces, 222, will be in the field of view of the electric eye 220. A predetermined count on the order of about six is chosen to discriminate between the situation where the tool is live (is rotating) and where it is at rest but the reflecting surfaces 222 are transmitting to the emitter/detector as they move into its field of vision.

If the pulse count in the decade counter 225 from emitter/detector 202 exceeds the threshold level, it therefore means that for some reason the tool or spindle is not at rest and that the weld is defective or has otherwise not been accomplished. A defect or malfunction signal is thereby generated by the one shot 226 which may be a Quad 2 logic chip with an RC timing network. The one shot 226, on receiving a signal from the decade counter 225 that the threshold pulse count has been exceeded, emits a pulse of approximately 10 ms duration indicating a "live" tool or spindle condition (i.e. defective weld).

In the multiple-spindle embodiment, whether or the not decade counter 225 accumulates a pulse count in excess of the threshold value while a particular spindle is before it, a reset signal (see FIG. 8, time chart F) is generated by the passing of another spindle into proximity with the electronic eye. This reset signal is generated by detector 204 which is similar to detector 201 except that it is actuated by each of the weld station spindles or tools. This logic probe or reset probe produces one (approximately 5 ms) pulse at the conclusion of the scan cycle of each weld station tool. This resets the digital register or decade counter 225 of the live spindle detector 203 to zero. Thus, each weld station spindle is scanned individually. In other words, assuming a multiple spindle embodiment having for example 14 spindles, the detector 204 would generate fourteen reset signals for counter/register 225 during each 360° revolution of the machine, while the sensor 201 will only generate a single pulse during each revolution of the machine. The counter/register 225 is reset each time a weld station tool or spindle comes before it, regardless of whether a defect has been sensed.

When the one shot 226 produces a defective weld signal, it is received by the flag set timer 205 which may consist of an electronic time delay circuit; Circuit Model No. DK-126-A produced by Vercon, Inc. of Michigan, can be used for this purpose. This circuit is essentially an electronic time delay circuit which is triggered by a flying (i.e., non-clock or random) pulse and which will then execute its preset timing cycle automatically. At the conclusion of its timing cycle the flag set timer automatically resets.

As can best be seen from FIG. 7, the flag set timer 205 basically functions as a pulse stretcher and consists of a trigger board 227 and a NOR logic timing delay circuit. A pulse of approximately 10 ms duration is fed into trigger board 227 which instantly (less than 8 ms to output) outputs a signal from time delay circuit 228 until the circuit 228 times out; see FIG. 8, time chart D. The delay circuit 228, once triggered, will output a pulse for a preset period of time which is selected depending upon the speed of rotation of the machine and the number of spindles per machine; the time period being generally inversely proportional to the speed of rotation and the number of spindles.

The output from the circuit 228 is used to energize a solonoid 206 of a flag set unit 207; see FIG. 8, time chart E. The flag set unit may be either an electromagnetic or pneumatic device used to mechanically raise a flag indicator 209 directly associated with the defective product weld station. The mechanical flag or other optical, electrical, magnetic or audio indicator "informs" the machine and machine operator of the exact location of the defective product without further consideration of machine speed or container synchronization. The pneumatic finger 208 or similar element, when actuated, will trip a flag member 209 almost instantly and then retract, again almost instantly, so as not to trip the flag associated with the next weld station. It should be noted that when a flag member 209 has been tripped by the actuator 208, an operator looking at the machine will be able to visually determine at the point of exit, for instance the star wheel 40 of FIG. 2, the defectively welded products. The flag remains up until reset as described herein below.

There may be attached to the live tool detector 203 a live tool production lockout device 221 which essentially consists of a digital register or the like that receives any output pulse from the live tool detector 203. Each defective product produced updates the counter 221 by one. When a predetermined level of defects have been reached, the lockout device may automatically suspend further production by the machine and/or initiate a request for maintenance. The lockout counter/register may be a Vercon, Inc. Model No. DK-129 which can be connected to the DC logic power source and which will shut down the machine and/or call for maintenance if the accumulated number of rejected products exceeds a predetermined amount.

Figure 5:
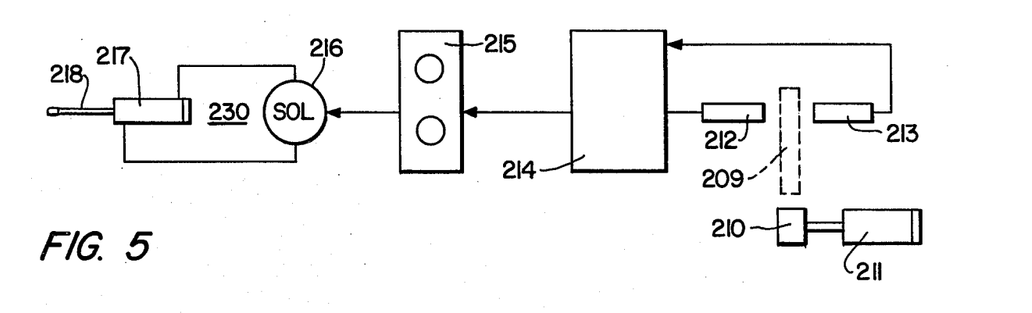
FIG. 5 is a block diagram of the defective product rejection system in accordance with the present invention.

As depicted in FIG. 5, in order to eject a defective container, the invention provides a flag reader 212-214, an automatic ejection timer 215 and an ejector 216.

The flag reader eye may be a beam break device that senses the interruption of a light beam between a light source 212 and an electric eye or light sensor 213. The reader 212-214 is positioned at a point in the rotation of the machine to coincide with the defective product's exit point from the machine (see FIG. 2). The flag or similar device breaks the beam of the electric eye or similar device (i.e. magnetic, electrical or other type of optical sensor) thus producing a pulse of about 5 ms output, as shown in FIG. 8, time chart G. It should be noted that this type of "time position" arrangement places the system in perfect synchronization with the spin weld machine at all times thereby removing machine production speed as a factor in the overall accuracy of the system.

In order to reset the flag position when mechanical flags are used, a reset unit comprising a roller 210 to contact the flag and a stationary finger 211. It should be understood that this unit is only exemplary for the mechanical flag embodiment, and other reset devices would be employed for other types of defect indicators. The indicator is not reset into its original position until after it passes light source 212 and light sensor 213.

The output pulse from the flag reader 214 is received by an auto ejector timer 215 which initiates a preset timing cycle (similar to the manner described herein above with regard to the flag set timer 205) as depicted in FIG. 8, time chart H. At the conclusion of its timing cycle the automatic ejector timer will automatically reset. The automatic ejector timer may be a Vercon, Inc. Model DK-127-A. The "on" time of timer 215 is determined by the position of the defective product at the time its corresponding flag is sensed and by how much time is required to sweep the defective product off of its tool or spindle as described below.

The container ejector 230 is similar to the flag set unit 206-208 described herein above and may preferably be a solonoid actuated pneumatic device that functions under the direction of the timing cycle of the automatic ejector timer to remove a defective container at the outfeed of the device. The device 230 comprises a solonoid 216, a pneumatic actuator 217 and an element, preferably a pneumatic finger, 218 to eject the container from the machine, and is timed in accordance with the output of timer 215 as depicted in FIG. 8, time chart I.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the specific means to generate the timing pulses and the timing signals, the indicator, means and indicator reset means as well as the specific ejector means may, for example, all be modified within the skill of the art. The embodiment was chosen and described in order to best explain the principles of the invention and its practical application to thereby enable others skilled in the art to best utilize the invention in various embodiments and with various modifications as are suited to the particular use contemplated. It is intended that the scope of the invention is defined by the claims appended hereto.

What is claimed is:

1. An apparatus for use with a spinwelder having a plurality of weld stations to determine the quality of a spinwelded bond, said apparatus comprising:
   (a) sensor means for sensing rotation of a tool at a spin weld station of said spinwelder;
   (b) a live tool detection means connected to said sensor means for determining a rotation condition of said tool and for generating an output signal if it is determined that said tool is rotating;
   (c) indicating means connected to said live tool detection means for receiving said output signal and producing an indication of the weld station at which said rotating tool is located.

2. The apparatus of claim 1 further comprising:
   (a) second sensor means responsive to said indicating means for sensing the presence of said indication, and producing a sensor signal,
   (b) ejector means connected to said second detection means and responsive to said detection signal for removing a defective product associated with said indicated weld station.

3. The apparatus of claim 1 wherein said sensor means comprises an optical means associated with said tool and operable for producing pulses when said tool rotates in proximity to said sensor.

4. The apparatus of claim 3 wherein said optical means comprises an optical scan bar circumferentially disposed on said tool and a frequency modulated infrared emitter-detector.

5. The apparatus of claim 3 wherein said live tool detection means is operatively connected to said sensor means for receiving and counting said pulses and for generating an output pulse when a pulse count exceeds a predetermined count.

6. The apparatus of claims 1 or 5 further including a first probe for operating said live tool detection means in sequence with the arrival of a first loaded weld station at a scan point.

7. The apparatus of claims 1 or 5 further including a second probe for producing a reset pulse at the conclusion of a scan cycle of said tool, and wherein said live tool detection means further comprises a counter and wherein said reset pulse resets said counter.

8. The apparatus according to claim 7 wherein said live tool detection means further includes a threshold detector for preventing an output until said counter exceeds a predetermined count.

9. The apparatus of claim 8 wherein said indicating means further comprises a timing means for receiving the output signal of the live tool detection means; said output signal comprising an energizing pulse of predetermined duration generated by said timing means, said pulse duration being dependent at least upon the number of said plurality of weld stations and on the speed of production of said spin weld machine, said timing means being operative at the end of said energizing pulse to automatically reset.

10. The apparatus of claim 9 wherein said indicating means further comprises a means for receiving said energizing pulse and actuating a mechanical indicator positioned proximate to the indicated weld station.

11. The apparatus of claim 10 wherein said means for receiving said energizing pulse is a solenoid having an associated pneumatic actuator for setting said mechanical indicator.

12. The apparatus of claim 11 wherein said mechanical indicator is a flag member positioned proximate to said weld station; said flag member being actuated to an operative position by said pneumatic actuator whereby said flag provides an indication of the location of a defective spinweld without regard to the speed of operation of the spinwelder.

13. The apparatus of claims 2 or 10 wherein said second sensor means is positioned at an exit point of a product from the spinwelder, the apparatus further including a reset means for resetting said indicating means.

14. The apparatus of claim 2 wherein said ejector means further comprise an ejector timer for receiving the detection signal of said second sensor means and initiating a preset timed signal, said ejector timer further being operable to automatically reset at the conclusion of said timed signal.

15. The apparatus of claim 14 wherein said ejector means further includes a solonoid for receiving said timed signals; said solonoid having an associated pneumatic actuator for removing defective products at an outfeed exit of the spinwelder.

16. A method for determining the quality of a spinwelded bond with a live tool inspection system:
  (a) scanning a weld station tool of a spinwelder, having a plurality of weld stations equipped with means for producing a rotation signal when said tool is rotated;
  (b) initiating power to said system at the arrival of a first weld station tool having a product thereon;
  (c) receiving said rotation signal with a detector;
  (d) comparing said rotation signal to a threshold value and generating an output when said rotation signal exceeds said present value;
  (e) energizing an indicator means to a set condition upon generation of said output whereby the location of a defective spinweld is identified.

17. The method of claim 16 further including:
  (a) detecting the presence of said indicator means in said set condition whereby a detection signal is generated;
  (b) energizing an ejector means upon generation of said detection signal to remove a product with said defective spinweld from the machine.

18. The method of claim 16 further comprising the step of resetting said system after a scan cycle of a tool whereby each tool is scanned individually.

19. The method of claim 16 further including the step of counting a number of occurrences that said step of comparing produces an output and automatically stopping further production of said spinwelder when the number of occurrences counted exceed a predetermined number.

20. The method of claim 19 further including the step of initiating a maintenance signal.

21. The method of claim 16 wherein said step of scanning further comprises scanning a series of pulses produced by a reflective scan bar on said weld station tool and said step of receiving further comprises receiving said series of pulses and said step of comparing further comprising comparing the number of said pulses with a preset register number and producing said output when said number of pulses exceeds said preset register number.

22. The method of claim 16 wherein said step of energizing further includes receiving said output with a timer and initiating a preset timing signal and resetting said timer automatically at the conclusion of said timing signal.

23. The method of claim 22 wherein the step of energizing further includes activating a solonoid by means of said preset timing signal whereby a mechanical indicator is placed in a set condition.

24. The method of claim 17 whereby the step of detecting the presence of said indicator means further comprises sensing with an electric eye the passing of said indicator at a point near an exit of said defective spinweld from its corresponding weld station tool and producing said detection signal in the form of an output pulse.

25. The method of claim 17 wherein said step of energizing an ejector means further comprises receiving said detection signal with an ejector timer whereby said ejector timer initiates a preset timing signal and resetting said ejector timer automatically at the conclusion of said preset timing signal.

26. The method of claim 25 wherein the step of energizing further includes activating an ejector solenoid by means of said preset timing signal whereby the defective product is ejected.

27. The method of claim 17 further including resetting said indicator means from its set condition after detecting the presence of said indicator in said set condition.

28. An electromechanical system for determining the quality of spinwelded bond produced by a spinwelder having a plurality of weld stations comprising:
  (a) a plurality of weld station tools having an optical scan bar for producing reflective pulses when said tool is rotated;
  (b) a logic probe for turning said system on in sequence with the arrival of the first tool having a product thereon at a scan point;
  (c) a first optical means for scanning each weld station tool as it passes said scan point and for emitting output pulses for each scan bar that rotates past its field of view;
  (d) a live tool detector for receiving the pulses from said first optical means and comparing the number of pulses received with a preset number and for emitting a detection pulse when the number of pulses received exceeds said preset number;
  (e) a timer for receiving said detection pulse and initiating an output corresponding to a present timing cycle at the conclusion of which said timer automatically resets;
  (f) an indicator unit responsive to said timer output for setting an indicator associated with a weld station having a defective spinweld product, said indicator identifying the exact location of the defective spinweld product without further consideration of said spinwelder speed.

29. The system according to claim 28 further including a second logic probe for resetting said live tool detector at the conclusion of a scan cycle of a tool whereby each tool is scanned individually.

30. The system according to claim 28 further including an indicator detector positioned at a point on said spin weld machine proximate to the exit point of the product from the machine, said indicator detector being operable to produce an output pulse when it detects an indicator in the set condition, and an auto ejector timer for receiving said output pulse and initiating an output corresponding to a preset timing cycle at the conclusion of which said auto ejector timer automatically resets, and a product ejector responsive to said auto ejector timer output for removing a defective product at an outfeed of said spinwelder.

31. The system according to claim 30 further including an indicator reset unit for returning the indicator to a reset position.

32. The system according to claim 28 further including a live tool production lockout means for receiving an output pulse from said live tool detector and for counting said pulses and comparing said count to a predetermined count, said lockout means including means for suspending further production by said spinwelder when said predetermined count is exceeded and means for initiating a maintenance signal.

33. A method for determining the quality of a spinwelded bond, produced by a spinwelder having a plurality of weld station tools, using an electro-mechanical system comprising:

(a) moving a weld station tool, having an optical scan bar for producing reflective pulses when said tool is rotated, past a scan point;
(b) turning on said system in sequence with the arrival of the first tool having a product therewith at said scan point;
(c) scanning each weld station tool as it passes said scan point and emitting output pulses for each scan bar that rotates past the scan point field of view;
(d) receiving said output pulses and comparing the number of pulses received with a preset number and emitting a detection pulse when the number of pulses received exceeds said preset number;
(e) receiving said detection pulse and thereupon initiating an output corresponding to a present timing cycle;
(f) setting an indicator associated with a weld station having a defective spinwelded product in response to said output whereby said indicator identifies the exact location of the defective product without further consideration of said spinwelder machine speed.

34. The method according to claim 33 further including resetting receiving said output pulses and comparing said pulses received at the conclusion of a scan cycle of a tool whereby each tool is scanned individually.

35. The method according to claim 33 further including the steps of:
positioning an indicator detector at a point on said spinweld machine proximate to an exit point of the product from the spinwelder;
producing an output pulse from said indicator detector when it detects an indicator in the set condition;
receiving said output pulse; and
initiating in response to said output pulse an ejector timer output corresponding to a present timeing cycle;
removing a defective spinweld product at an outfeed of said spinwelder in response to said ejector timer output.

36. The method according to claim 34 further including the step returning said indicator to a reset position.

37. The method according to claim 33 further including the step of receiving said detection pulses with a counter and counting said detection pulses and comparing said count to a predetermined count, and suspending further production by said spinwelder when said predetermined count is exceeded.

38. The method of claim 37 further comprising the step of initiating a maintenance signal when said predetermined count is exceeded.

* * * * *